US012735582B2

(12) United States Patent
Amin-Sanayei et al.

(10) Patent No.: US 12,735,582 B2
(45) Date of Patent: Sep. 15, 2026

(54) RETICULATED SOLID ELECTROLYTE SEPARATOR

(71) Applicant: Arkema Inc., King of Prussia, PA (US)

(72) Inventors: Ramin Amin-Sanayei, King of Prussia, PA (US); Jeremie Brezun, Marseilles (FR); Mark Aubart, King of Prussia, PA (US); Christian Collette, Antony (FR)

(73) Assignee: Arkema Inc., King of Prussia, PA (US)

( * ) Notice: Subject to any disclaimer, the term of this patent is extended or adjusted under 35 U.S.C. 154(b) by 564 days.

(21) Appl. No.: 17/616,793

(22) PCT Filed: Jun. 18, 2020

(86) PCT No.: PCT/US2020/038397

§ 371 (c)(1),
(2) Date: Dec. 6, 2021

(87) PCT Pub. No.: WO2020/257430

PCT Pub. Date: Dec. 24, 2020

(65) Prior Publication Data

US 2022/0306870 A1 Sep. 29, 2022

Related U.S. Application Data

(60) Provisional application No. 62/863,602, filed on Jun. 19, 2019.

(51) Int. Cl.

| | |
|---|---|
| ***C09D 5/24*** | (2006.01) |
| ***C08K 3/22*** | (2006.01) |
| ***C08K 3/32*** | (2006.01) |
| ***C09D 7/61*** | (2018.01) |
| ***C09D 127/16*** | (2006.01) |
| ***H01M 10/056*** | (2010.01) |
| ***H01M 50/403*** | (2021.01) |

(Continued)

(52) U.S. Cl.

CPC .................. *C09D 5/24* (2013.01); *C08K 3/32* (2013.01); *C09D 7/61* (2018.01); *C09D 127/16* (2013.01); *C08K 2003/2244* (2013.01); *C08K 2201/006* (2013.01); *C08K 2201/011* (2013.01); *H01M 10/056* (2013.01); *H01M 50/403* (2021.01); *H01M 50/446* (2021.01); *H01M 50/491* (2021.01); *H01M 2300/0065* (2013.01)

(58) Field of Classification Search

CPC ........ C08K 2201/006; C08K 2201/011; C08K 3/32; C08K 2003/2244; C08K 3/04; C04B 2235/3284; C04B 2235/3287; C04B 2235/42; C04B 2235/444; C04B 2235/445; C04B 35/01; C04B 35/447; C04B 35/462; C04B 35/486; C04B 2235/3203; C04B 2235/3227; C04B 2235/768; C08J 5/18; C08J 9/008; C08J 9/28; C08L 1/286; C08L 27/16; C08L 33/02; C08L 33/12; C09D 5/24; C09D 7/61; C09D 127/16; C09D 7/67; C09D 101/286; C09D 133/02; C09D 133/12; H01M 10/056; H01M 10/0525; H01M 10/0565; H01M 50/403; H01M 50/446; H01M 50/491; H01M 50/409; H01M 50/414; H01M 50/426; H01M 50/434; H01M 50/443; H01M 2300/0065; H01M 2300/0068; H01M 2300/0082; H01M 2300/0091

See application file for complete search history.

(56) References Cited

U.S. PATENT DOCUMENTS

| | | | |
|---|---|---|---|
| 4,524,194 | A | 6/1985 | Dumoulin |
| 5,310,860 | A | 5/1994 | Maj et al. |

(Continued)

FOREIGN PATENT DOCUMENTS

| | | | |
|---|---|---|---|
| JP | 2011119158 | A | 6/2011 |
| WO | 2014179034 | A1 | 11/2014 |

OTHER PUBLICATIONS

Lu, et al; "Hybridizing Poly(vinylidene fluoride-co-hexafluoropropylene) with Li6.5La3Zr1.5Ta0.5O12 as a Lithium-Ion Electrolyte for Solid State Lithium Metal Batteries"; Chemical Engineering Journal, vol. 367; pp. 230-238; 2019.

Tuller, Harry L.; "Ionic Conduction in Nanocrystalline Materials"; Solid State Ionics; vol. 131; pp. 143-157; 2000.

Falco, Marisa et al; "UV-Cross-Linked Composite Polymer Electrolyte for High-Rate, Ambient Temperature Lithium Batteries"; ACS Applied Energy Materials; vol. 2, No. 3, Mar. 25, 2-019, pp. 1600-1607.

(Continued)

*Primary Examiner* — Kiran Quraishi Akhtar
(74) *Attorney, Agent, or Firm* — Joanne Rossi

(57) ABSTRACT

This invention discloses a method of fabricating a reticulated solid electrolyte/separator (RSES) which is suitable both as electrolyte and separator in a solid state battery. The reticulated composite is produced by casting and drying of a slurry which exhibits a high yield stress (greater than 50 dyne/cm2) and comprised of a high MW resin dissolved in a solvent (having solution viscosity of higher than 100 cp at 5% in NMP at room temperature) and dispersed nanoparticles of solid electrolyte of high specific surface areas (i.e. greater than 1 m2/g, preferable greater than 10 m2/g) including but not limited to LLZO, LSP, or LIPON or derivatives thereof. This reticulated solid electrolyte/separator exhibits superior cycling properties and high ionic conductivity, resists lithium dendrite penetration, and maintains a high dimensional stability (less than 10% shrinking) at elevated temperatures (up to 140° C.). In addition, the present disclosure relates to electrochemical cells comprising such a reticulated film composite to act as both electrolyte and separator.

20 Claims, No Drawings

(51) Int. Cl.
*H01M 50/446* (2021.01)
*H01M 50/491* (2021.01)

(56) References Cited

U.S. PATENT DOCUMENTS 5,416,172 A 5/1995 Blondel et al.
6,187,885 B1 2/2001 Barber
8,936,878 B2 1/2015 Morin
9,180,412 B2 11/2015 Jo et al.
9,412,986 B2 8/2016 Huang
9,637,595 B2 5/2017 Jeol et al.
2004/0131934 A1 7/2004 Sugnaux et al.
2014/0178759 A1 6/2014 Worsley et al.
2015/0340676 A1* 11/2015 Schmidhauser .... H01M 50/426 429/131
2016/0099453 A1 4/2016 Venkataramani et al.
2016/0280854 A1 9/2016 Briffaud et al.
2017/0162911 A1 6/2017 Gaben
2017/0179472 A1 6/2017 Allie et al.
2018/0043656 A1* 2/2018 Song .................. H01M 50/491
2019/0109359 A1* 4/2019 Aetukuri ............ H01M 8/1048
2021/0074991 A1 3/2021 Gaben

OTHER PUBLICATIONS

Xu, Linghong et al; “Garnet-Doped Composite Polymer Electrolyte With High Ionic Conductivity for Dendrite-Free Lithium Batteries”; Journal of Energy Storage; vol. 24, May 20, 2019, p. 100767.

Zhang, Xue, et al; Synergistic Coupling Between Li6.75La3Zr1.75Ta0.25O12 and Poly(vinylidene fluoride) Induces High Ionic Conductivity, Mechanical Strength and Thermal Stability of Solid Composite Electrolyte; State Key Lab of New Ceramics and Find Processing, School of Materials Science and Engineering, Tsinghua University, Beijing 100084, China.

* cited by examiner

RETICULATED SOLID ELECTROLYTE SEPARATOR

CROSS-REFERENCE TO RELATED APPLICATIONS

This application is a national stage application under 35 U.S.C. § 371 of PCT Application PCT/US2020/038397, filed 18 Jun. 2020; which claims benefit to U.S. Provisional Patent Application No. 62/863,602, filed 19 Jun. 2019; said applications are herein incorporated by reference.

FIELD OF THE INVENTION

This invention discloses a method of fabricating a reticulated (porous, open cell matrix structure) film composite suitable as a separator in electrochemical cells.

BACKGROUND

Lithium ion batteries have come a long way and can meet many of requirements for transportation, however, still there are needs for safety improvement, because the liquid organic electrolyte in lithium-ion battery cells is highly reactive and flammable. Therefore, there is growing interest in the replacing liquid electrolyte with a more robust and nonflammable solid lithium-ion conducting materials. Moreover, the solid electrolyte materials not only allow more robust cell operations but also facilitate the integration of Li-metal anode which offers the highest volumetric energy density. Combining both solid state electrolyte and Li-metal anode could meet the aggressive cost reduction, desired density, and cycle life requirements for EV implementations.

There are several unresolved challenges associated with using solid state lithium ion conductor with a Li-metal anode. The main issues are uneven interfacial lithium deposition which could lead to formation of Li-dendrite; low ionic conductivity especially at interfaces of solid electrolyte with cathode and anode, poor oxidation-reduction stability at cathode or anode interfaces, and insufficient both mechanical strength and flexibility to accommodate expansion/contraction of especially Li-metal anode. These challenges have so far prevented largescale adaptations of solid state batteries in the transportation and in the energy storage sectors.

A solid-state battery is a battery technology that uses solid electrodes and a solid electrolyte, instead of the liquid or polymer electrolytes found in lithium-ion or lithium polymer batteries. During the charge and discharge cycles, lithium dendrites gradually grow out from the lithium metal surface, through the electrolyte, and ultimately contact the positive electrode. This causes an internal short circuit in the battery, rendering the battery unusable after a relatively short calendar life. Formation of Lithium dendrite could also reduce coulombic efficiency of the battery. Moreover, if cycling of lithium electrodes result in a "mossy" lithium deposits that can dislodge from the negative electrode and thereby diminishes the battery's capacity. Most of attempts to prevent lithium dendrite growth either were not successful or not commercially viable.

The typical approach to prepare electrolyte/separator composite is based on mixing the polymer binder with ceramic and tape-casting the slurry to make a flexible film in which the ceramic particles dispersed in a polymer matrix. However, the noncontiguous network of ceramic particles forces the lithium ions to diffuse through the polymer matrix, limiting the overall ionic conductivity.

Also, there are known separators based on nonwovens such as inorganic nonwovens made from glass or ceramic materials, or organic nonwovens such as cellulose polyacrylonitrile, polyamides, polyethylene terephthalate, and/or engineering resins (U.S. Pat. Nos. of 8,936,878 and 9,412,986).

To increase the percolation with in composite, electrospun nanofibers has been tried (U.S. Pat. No. 9,180,412). The use of electrospun nanofibers is another way to increase the length of the ceramic network with in the polymer matix. However the nanofibers are typically oriented along the membrane plane and fail to provide a continuous ceramic percolative network along the conduction direction in the battery application, i.e. perpendicular to the membrane plane. The nanofibers also tend to be randomly distributed within the polymer matrix, resulting in aggregation and resistive interconnections detrimental for reaching high ionic conductivity.

Separators for lithium ion batteries are often made of melt processable plastics, which are either solution cast or extruded to form films and then stretched to generate 30-60% porosity within the film. Today's common separators are generally based on polypropylene (melting point about 160-165° C.), polyethylene (melting point about 110-135° C.) or blends thereof. F, those pure porous polymer separators are known to be susceptible to lithium dendrite penetration when used in the batteries having lithium metal anodes which also could lead to short circuit within cell. Therefore, they are not deemed to be inherently safe.

PVDF has been found to be useful as a binder, as well as coating for the separator in a non-aqueous electrolytic devices because of its excellent electro-chemical resistance and superb adhesion among fluoropolymers. The separator forms a barrier between the anode and the cathode in the battery to prevent electronic shorts while facilities high ionic transportation.

Garnet-type LLZO exists in two stable crystalline form where the tetragonal phase is very stable and has a very low ionic conductivity (~$10^{-6}$ S·cm-1) and the cubic phase has disordered Li sites, which results in a much higher bulk ionic conductivity (~$10^{-4}$ S·cm-1) at room temperature. Therefore, a number of studies have focused on the preparation of cubic phase applying either heat treatment or incorporation of other metals such as Al, Ga, or Ta into the LLZO structure, for example, Al doped LLZO only stabilized the cubic phase for high ionic conductivity ($5.1\times10^{-4}$ S·cm-1) but also enhanced the surface and interfacial properties [Solid State Ionics, 2000, vol. 131, PP. 143-157.].

Lu and coworkers [Chemical Engineering Journal, Vol 367 (2019), PP. 230-238] have attempted to produce hybrid matrix of PVDF and LLZTO (garnet-type Li6.5La3Zr1.5Ta0.5O12) as an ion conducting media. They casting a mixture of LLZTO and PVDF-HFP and obtained a solid matrix.

DESCRIPTION OF THE INVENTION

There is an urgent need for porous media which can circumvent lithium dendrite crossover in a lithium metal anode and/or during a superfast charging of lithium ion batteries. A feasible solution is to have a very uniform micro porous interface between cathode and anode which could facilitate uniform transportation of Li-ions to reduce or circumvent dendrite formation, while resisting oxidation. Moreover, it should exhibit sufficient mechanical strength to resist dendrite penetration if dendrites are formed.

"Copolymer" is used to mean a polymer having two or more different monomer units. "Polymer" is used to include homopolymer and copolymers. Resin and polymer are used interchangeably. The polymers may be homogeneous, heterogeneous, and may have a gradient distribution of co-monomer units. All references cited are incorporated herein by reference. As used herein, unless otherwise described, percent shall mean weight percent. Unless otherwise stated, molecular weight is a weight average molecular weight as measured by GPC, using a polymethyl methacrylate standard. Crystallinity and melting temperature are measure by DSC as described in ASTM D3418 at heating rate of 10 C/min. Melt viscosity is measured in accordance with ASTM D3835 at 230° C. expressed in kPoise @100 Sec-1. Dilute solution viscosity and reduced viscosity of polymers is measured as described in ASTM D2857 at room temperature.

By reticulated film or coating we mean a film or coating with a porous open cell matrix structure. "Open" means the pores are not enclosed. Fluids can moves between pores. The void fractions or porosity can be measured by compressing the open cell matrix or by density measurement, or by filling the void with a liquid and measuring the change in density. Preferably, the voids (porosity) are measured by density meaning that the density of a film is compared to the density of the solid resin.

Nano sized filler or nano size particles means that the filler or particle size is less than 1 micron, preferably less than 500 nm preferably less than 200 nanometers. The nano size particles can be less than 100 nm. Particles size is volume average particles size as measured by light scattering. (such as a Nicom or Microtech instrument).

By high specific surface area particles means that the surface area of the particles is greater than 1 $m^2/g$, preferably greater than 5 $m^2/g$, more preferably greater than 10 $m^2/g$. Preferably between 1 $m^2/g$ and 1000 $m^2/g$, more preferably between 1 $m^2/g$ and 700 $m^2/g$, and even more preferably between 10 $m^2/g$ and 500 $m^2/g$. The surface area of the particles can be between 5 and 700 $m^2/g$. Some high specific surface area particles have 3 dimensional branching structures, this can be referred to as a fractal shape which can result in particles with large aspect ratios. Fractal shape are aggregates of primary particles that have 3 dimensional branching.

By high molecular weight means having solution viscosity of at least 100 cp measured at 5% in NMP at room temperature (25° C.), preferably between 100 cp and 10,000 cp, more preferably between 100 cp and 5000 cp or having reduced viscosity, Rv of at least 0.2 dl/g upto 2 dl/g.

Yield stress is the minimum shear stress required to initiate flow in a fluid. A high yield stress is at least 50 $dyne/cm^2$ preferably greater than 100 dyne/cm2, greater than 125 dyne/cm2. The yield stress can be up to 5000 dyne/cm2, preferably up to 3000 dyne/cm2. In addition, the slurry must be castable meaning the solution viscosity of the slurry is less than 20,000 cP at room temperature, preferably less than 10,000 cp.

The invention provides for a reticulated film composite with nano sized pores and a method of making the reticulated film composite with nano sized pores. Nanosized pores have an average pore size of less than 500 nm, preferably from 2 nm to 500 nm. The invention also provides for an electrode coating in a battery made from the reticulated film composite with nano sized pores.

The reticulated film composites can be produced with different type of resins and wide variety of nano-size particles. The reticulated film composites can be made with particles that have a fractal shape structures that are made of aggregates of primary particles.

The reticulated film composite is made by combining high specific surface area particles (lithium based conductive materials) and high molecular resins in solvent at room temperature (25° C.) resulting in a slurry that exhibits a high yield stress (greater than 50 $dyne/cm^2$) even at low solid content (i.e. total solids less than 30 weight %, preferably less than 20 wt %, more preferably less than 12% or even less than 10%). Casting the slurry and drying at elevated temperatures thereby forming a reticulated film composite with nano sized pores.

Unexpectedly it was found that a slurry of a high specific surface area particles (i.e. lithium based conductive materials) and a high molecular resins, (for example, high MW-PVDF (having solution viscosity of greater than 100 cp at 5% in NMP at room temperature), or high MW-PMMA (having reduced viscosity, Rv of 0.5 dl/g), which are made in NMP can exhibit high yield stress (greater than 50 $dyne/cm^2$) even at low solid content (i.e. total solids less than 12%). When this high yield stress slurry was cast and dried at elevated temperatures, (i.e. 50 to 180° C., or from 80 to 180, preferably above 120° C.), a reticulated film composite with a nano sized pores was formed.

In one embodiment of the invention, high molecular weight PVDF (with solution viscosity of greater than 100 cp at 5% in NMP at room temperature) which is semi-crystalline was used in the invention.

High molecular weight resin like PMMA (with reduced viscosity, Rv, of greater than 0.5 dl/g), and also high MW PAA (with solution viscosity of from 100 and up to 10000 cp, preferably up to 5000 in water at pH7 at room temperature) can be used to obtain a high yield stress slurry (greater than 50 $dyne/cm^2$), and ultimately produce the reticulated film composites of similar properties to reticulated film made with PVDF.

The reticulated film composites can be produced with different type of resins and wide varieties of nano-size particles.

The filler type nanoparticles of solid lithium based electrolyte useful in the invention, for example, conductive fillers containing Lithium include, but not limited to $Li_7La_3Zr_2O_{12}$ (LLZO), $Li_3PS_4$ (LSP), $Li_6PS_5X$ (with X=Cl, Br, or I) (Lithium argyrodite), lithium phosphorous oxynitride (Lipon), $Li_{2+2x}Zn_{1-x}GeO_4$ (x=0.55) (LISICON-like), $Li_{0.34}La_{0.51}TiO_3$ (perovskite-like) or mixtures thereof. LLZO-based nano particles, LSP-based nano particles, LIPON-based nano particles or mixture thereof can also be used in the invention. LLZO doped with of other metals such as Al, Ga, or Ta can be used in the invention.

Optionally from 0.01 to 10 wt, preferably 0.1 to 3 wt percent based on the total film weight of ion conducting lithium salts can be added to the mixture in order to improve ionic conductivity, including but not limited to LiCl, $LiPF_6$, LiTDI, LiFSI, and LiTFSI. LiTDI is Lithium 4,5-dicyano-2-(trifluoromethyl)imidazole. LiFSI is Lithium bis(fluorosulfonyl)imide. LiTFSI is Lithium bis(trifluoromethanesulfonyl)imide.

Optionally reinforcing filler can be added to the mixture in order to improve mechanical strength or alter the other features of RSES. The filler type can vary widely too, for example, insolating fillers include, but not limited to alumina, silica, $BaTiO_3$, CaO, ZnO, bohemite, $TiO_2$, SiC, $ZrO_2$, boron silicate, $BaSO_4$, nano-clays, or mixtures thereof. Also, useful organic filler are chapped fibers, include, but not limited to aramid fillers and fibers, polyetherether ketone and polyetherketone ketone fibers, PTFE fibers, and nano-fibers, carbon nano-tubes, and mixture thereof.

The resin should have a high solution viscosity, i.e. higher than 100 cp measured at 5% in NMP at room temperature. Preferably, the solution viscosity is between 100 and 10,000 cp, more preferably between 100 and 5000 cp at 5% solids in NMP at room temperature. For water soluble polymers the solution viscosity is from 100 cp to 10000 cp, preferably between 100 cp and 5000 cp measured in water at 2% and pH of 7 at room temperature (25° C.). The pH can vary from 2 to 12 depending on polymer type and application. Polymers useful in the invention include but not limited to homopolymers and copolymers of polyvinylidene fluoride (PVDF), poly ethylene-tetrafluoride ethylene (PETFE), polyvinyl fluoride (PVF), poly (alkyl)acrylates, poly (alkyl) methacrylates, poly styrene, poly vinyl alcohol (PVOH), polyesters, polyamides, poly acrylonitrile, poly acrylamide, carboxymethyl cellulose CMC, polyacrylic acids (PAA), polymethacrylic acid (PMAA). Other useful polymers include polyether ketone ketone, polyether ether ketone, and polyesters.

Polyvinylidene Fluoride

In a preferred embodiment, the polymer is a polyvinylidene fluoride homopolymer or copolymer. The term "vinylidene fluoride polymer" (PVDF) used herein includes both normally high molecular weight homopolymers, copolymers, and terpolymers within its meaning. Copolymers of PVDF are particularly preferred, as they are softer—having a lower Tm, melting point and a reduced crystalline structure. Such copolymers include vinylidene fluoride copolymerized with at least one comonomer. Most preferred copolymers and terpolymers of the invention are those in which vinylidene fluoride units comprise at least 50 mole percent, at least 70 mole percent preferably at least 75 mole %, more preferably at least 80 mole %, and even more preferably at least 85 mole % of the total weight of all the monomer units in the polymer.

Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. In some preferred embodiments the comonomer is selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether.

Particularly preferred are copolymers composed of from at least about 75 and up to 90 mole percent vinylidene fluoride, and correspondingly from 10 to 25 mole percent hexafluoropropene. Terpolymers of vinylidene fluoride, hexafluoropropene and tetrafluoroethylene are also representatives of the class of vinylidene fluoride copolymers, embodied herein.

In one embodiment, up to 50%, preferably up to 20%, and more preferably up to 15%, by weight of hexafluoropropene (HFP) units and 50%, preferably 80%, and more preferably 85%, by weight or more of VDF units are present in the vinylidene fluoride polymer. It is desired that the HFP units be distributed as homogeneously as possible to provide PVDF-HFP copolymer with excellent dimensional stability in an end-use environment—such as in a battery.

The copolymer of PVDF for use in the separator coating composition preferably has a high molecular weight as measured by melt viscosity. By high molecular weight is meant PVDF having a melt viscosity of greater than 10 kilopoise, preferably greater than 20 kilopoise, according to ASTM method D-3835 measured at 232° C. and 100 sec-1.

Fluoropolymers such as polyvinylidene-based polymers are made by any process known in the art. Processes such as emulsion and suspension polymerization are preferred and are described in U.S. Pat. No. 6,187,885, and EP0120524.

Synthetic Polyamides

A polyamide is a polymer (substance composed of long, multiple-unit molecules) in which the repeating units in the molecular chain are linked together by amide groups. Amide groups have the general chemical formula CO—NH. They may be produced by the interaction of an amine ($NH_2$) group and a carboxyl ($CO_2H$) group, or they may be formed by the polymerization of amino acids or amino-acid derivatives (whose molecules contain both amino and carboxyl groups).

The synthesis of polyamides is well described in the art, examples are WO15/071604, WO14179034, EP0550308, EP0550315, U.S. Pat. No. 9,637,595.

Polyamides can be condensation or ring opening products:

- of one or more amino acids, such as aminocaproic, 7-aminoheptanoic, 11-aminoundecanoic and 12-aminododecanoic acid, or of one or more lactams such as caprolactam, oenantholactam and lauryllactam; with
- of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic, terephthalic, adipic, azelaic, suberic, sebacic and dodecanedicarboxylic acid.

Examples of polyamides can include PA 6, PA 7, PA 8, PA9, PA 10, PAll, and PA 12 and copolyamides like PA 6,6.

The copolyamides can be from the condensation of at least two alpha, omega-amino carboxylic acids or of two lactams or of one lactam and one alpha,omega-amino carboxylic acid. The copolyamides can be from the condensation of at least one alpha,omega-amino carboxylic acid (or one lactam), at least one diamine and at least one dicarboxylic acid.

Examples of lactams include those having 3 to 12 carbon atoms on the main ring, which lactams may be substituted. For example, of β,β-dimethylpropiolactam, α,α-dimethylpropiolactam, amylolactam, caprolactam, capryllactam and lauryllactam.

Examples of alpha,omega-amino carboxylic acids include aminoundecanoic acid and aminododecanoic acid. Examples of dicarboxylic acids include adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids having a dimer content of at least 98% and preferably being hydrogenated) and dodecanedioic acid, HOOC—(CH2)10-COOH.

The diamine can be an aliphatic diamine having 6 to 12 carbon atoms; it may be of aryl and/or saturated cyclic type. Examples include hexamethylenediamine, piperazine, tetramethylenediamine, octamethylenediamine, decamethylenediamine, dodecamethylenediamine, 1,5-diaminohexane, 2,2, 4-trimethyl-1,6-diaminohexane, diamine polyols, isophoronediamine (IPD), methylpentamethylenediamine (MPDM), bis(aminocyclohexyl)methane (BACM) and bis (3-methyl-4-aminocyclohexyl)methane (BMACM).

Examples of copolyamides include copolymers of caprolactam and lauryllactam (PA 6/12), copolymers of caprolactam, adipic acid and hexamethylenediamine (PA 6/6-6), copolymers of caprolactam, lauryllactam, adipic acid and hexamethylenediamine (PA 6/12/6-6), copolymers of caprolactam, lauryllactam, 11-aminoundecanoic acid, azelaic acid and hexamethylenediamine (PA 6/6-9/11/12), copolymers of caprolactam, lauryllactam, 11-amino-undecanoic acid, adipic acid and hexamethylenediamine (PA 6/6-6/11/12), and copolymers of lauryllactam, azelaic acid and hexamethylenediamine (PA 6-9/12).

Polyamides also include polyamide block copolymers, such as polyether-b-polyamide and polyester-b-polyamide.

Another polyamide is Arkema's ORGASOL® ultra-fine polyamide 6, 12, and 6/12 powders, which are microporous, and have open cells due to their manufacturing process. These powders have a very narrow particle size range that can be between 5 and 60 microns, depending on the grade. Lower average particle sizes of 5 to 20 are preferred.

Acrylic

Acrylic polymers as used herein is meant to include polymers, copolymers and terpolymers formed from methacrylate and acrylate monomers, and mixtures thereof. The methacrylate monomer and acrylate monomers may make up from 51 to 100 percent of the monomer mixture, and there may be 0 to 49 percent of other ethylenically unsaturated monomers, included but not limited to, styrene, alpha methyl styrene, acrylonitrile. Suitable acrylate and methacrylate monomers and comonomers include, but are not limited to, methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. (Meth) acrylic acids such as methacrylic acid and acrylic acid can be comonomers. Acrylic polymers include multilayer acrylic polymers such as core-shell structures typically made by emulsion polymerization.

Styrene

Styrenic polymers as used herein is meant to include polymers, copolymers and terpolymers formed from styrene and alpha methyl styrene monomers, and mixtures thereof. The styrene and alpha methyl styrene monomers may make up from 50 to 100 percent of the monomer mixture, and there may be 0 to 50 percent of other ethylenically unsaturated monomers, including but not limited to acrylates, methacrylates, acrylonitrile. Styrene polymers include, but are not limited to, polystyrene, acrylonitrile-styrene-acrylate (ASA) copolymers, styrene acrylonitrile (SAN) copolymers, styrene-butadiene copolymers such as styrene butadiene rubber (SBR), methyl methacrylate-butadiene-styrene (MBS), and styrene-(meth)acrylate copolymers such as styrene-methyl methacrylate copolymers (S/MMA).

Polyolefin as used herein is meant to include polyethyene, polypropylene, and copolymers of ethylene and propylene. The ethylene and propylene monomers may make up from 51 to 100 percent of the monomer mixture, and there may be 0 to 49 percent of other ethylenically unsaturated monomers, including but not limited to acrylates, methacrylates, acrylonitrile, anhydrides. Examples of polyolefin include ethylene ethylacetate copolymers (EVA), ethylene(meth)acrylate copolymers, ethylene anhydride copolymers and grafted polymers, propylene(meth)acrylate copolymers, propylene anhydride copolymers and grafted polymers.

The solvents useful in the invention to make the slurry include, but are not limited to water, N-methyl-2-pyrrolidone (NMP), toluene, tetrahydrofuran (THF), acetone and hydrocarbons. In preferred embodiments, the solvent is NMP, water, or acetone. The solvent must be able to dissolve the polymer used providing a visibly clear solution. For example, PVDF is soluble in NMP. PVDF is not soluble in water and therefore water would not be used for PVDF. Poly vinyl alcohol (PVOH), poly acrylamide, carboxymethyl cellulose CMC, Polyacrylic acids (PAA), and their copolymers are generally soluble in water.

Other Additives:

The coating composition of the invention may further contain effective amounts of other additives, including but not limited to fillers, leveling agents, anti-foaming agents, pH buffers, and other adjutants typically used in formulation while meeting desired separator requirements.

In a slurry coating composition of the invention, could further optionally have wetting agents, thickeners or rheology modifiers.

Wetting agents could be present in the coating composition slurry at 0 to 5 parts, or 0.1 to 5 parts preferably from 0 to 3 parts, or 0.1 to 3 parts of one or more wetting agents per 100 parts of solvent. Surfactants can serve as wetting agents, but wetting agents may also include non-surfactants. In some embodiments, the wetting agent can be an organic solvent. The presence of optional wetting agents permits uniform dispersion of powdery material(s) into the slurry. Useful wetting agents include, but are not limited to, ionic and non-ionic surfactants such as the TRITON series (from Dow) and the PLURONIC series (from BASF), BYK-346 (from BYK Additives) and organic liquids that are compatible with the solvent, including but not limited to NMP, DMSO, and acetone.

Thickeners and/or rheology modifiers may be present in the coating composition at from 0 to 10 parts, preferably from 0 to 5 parts of one or more thickeners or rheology modifiers per 100 parts of water (all parts by weight). Addition of thickener or rheology modifier to the above dispersion prevents or slows down the settling of powdery materials while providing appropriate slurry viscosity for a casting process. In addition to organic rheology modifiers, inorganic rheology modifiers can also be used alone or in combination.

The total solid content and ratio of resin to nano particle filler should be so chosen that provides a high yield stress slurry, i.e. higher than 50 dyne/cm$^2$, preferably greater than 75 dyne/cm2 even more preferably greater than 100 dyne/cm2 or even greater than 200 dyne/cm2. The yield stress can be up to 5000 dyne/cm2, preferably up to 3000 dyne/cm2.

The solids content of the slurry can be from 2 weight percent to 30 weight percent solids, preferably from 2 to 20 weight %, even more preferably from 2 to 12%, or 2 to 10 weight % (based on weight of polymer plus weight of nanoparticles).

The nanoparticles has high specific surface area good disperse-ability in the solvent and preferably are fractal shape structures.

Several factors can affect the porosity or density of the reticulated film composites such as reducing solids in the slurry (i.e. from 10% to 6%) yields a few percent higher porosity, a higher drying temperature (i.e. 180° C. instead of 100° C.) increases porosity by few percent, a higher MW resin produces a higher porosity, a higher surface area filler makes a higher porosity. All these tunable properties can be applied to produce a reticulated film composite with a desired properties for a specific application.

Application:

One application of a reticulated film composite of PVDF made using nanoparticles (Examples include lithium based conductive material) and having a porosity of 20 to 80%, preferably 25 to 80% is to be used as separator/electrolyte in a solid state battery to increase safety and enhance battery performance. The reticulated film composite not only does not shrink at elevated temperatures but also will expand at hot spots inside the battery to further isolate runaway electrodes from each other.

Another advantage of reticulated film composite is that can be simultaneously cast with electrodes, i.e. using a double slot die casting machine to cast two slurry layers (active electrode, and separator layers) at the same time onto the current collector using wet-on-wet technique. An integrated electrode and separator structure is subsequently formed during the drying and calendaring steps.

A reticulated film composite of lithium based conductive material such as cubic nano-LLZO or other nanosized lithium based conductive material (solid state ionic contacting materials) can be used as an electrolyte/separator in a solid state lithium battery to enhance battery performance and safety. By using the reticulated composite film, the diffusion length or path that electrons or ions must traverse is minimized, and the interfacial area is maximized. The resin can be polyvinylidene fluoride to resist oxidation on the cathode face, and specialty acrylics or PEO (polyethylene oxide) resins to resist reduction in the anode face. Further, the reticulated film composite is able to accommodate the volume change that will occur on charging and discharging, and resist any possible dendrite penetration.

The response to temperature can be tuned with resin composition, For example varying the amount of HFP comonomer in PVDF resin because a reticulated film composite made of a higher HFP (i.e. 20% HFP) content resin will swell/expand at lower temperature relative to those with lower HFP (i.e. 8% HFP) content which may require a higher temperature to obtain the same swelling/expansion. Preferred weight percent of HFP in a copolymer of VDF is from 1 to 25 wt %, although higher wt percent HFP can be used). Another advantage of reticulated film composite is that can be simultaneously cast with electrodes, i.e. using a double slot die casting machine to cast two slurry layers (active electrode, and separator layers) at the same time onto the current collector using wet-on-wet technique. An integrated electrode and separator structure is subsequently formed during the drying and calendaring steps. For multilayer composite structures, like electrode separators in an electrochemical device or filter media, can be cast wet on wet. When using the wet-on-wet technique the two layers become intertwined with no abrupt interfaces resulting in better adhesion. The reticulated film or coating can be cast simultaneously with and directly onto the substrate in a one step wet on wet process.

Use of Coating to Form Separator

In a preferred embodiment, the composition of the invention can withstand the harsh environment within the battery or any other electrochemical devices and can be readily processed into a coating. When coated onto an electrode the coating acts as an electrolyte/separator without the need for a separate separator base. The separator coating contains electrochemically conductive lithium based conductive material particles. Preferably, the lithium based electro conductive nano particle particles make up the largest volume percent of the separator/electrolyte coating composition.

The conductive nano particles in the coating composition permit an interstitial volume to be formed among them, thereby serving to form micropores and to maintain the physical shape as a spacer. Additionally, because the particles are characterized in that their physical properties are not changed even at a high temperature of 200° C. or higher, the coated separator using the particles has excellent heat resistance. The inorganic particles may be in the form of particles or fibers. Mixtures of these are also anticipated.

Materials of low density are preferred over higher density materials, as the weight of the battery produced can be reduced.

In one embodiment, the particles or fibers may be surface treated, chemically (such as by etching or functionalization), mechanically, or by irradiation (such as by plasma treatment).

The lithium based particles are nano size. Furthermore, excessively large pores may increase a possibility of internal short circuit being generated during repeated charge/discharge cycles.

The lithium based electroconductive particles are present in the coating composition at 20 to 95 weight percent, and preferably 20-90 weight percent, based on the total of polymer solids and inorganic particles. When the content of the inorganic materials is less than 20 weight percent, the binder polymer is present in such a large amount as to decrease the interstitial volume formed among the inorganic particles and thus to decrease the pore size and porosity, resulting in degradation in the quality of a battery.

A reticulated film composite can also be used as catalyst support to provide high surface media for catalytically driven reactions and improve catalyst efficiency. The catalyst can be incorporated into reticulated film or can be deposited on it.

Coating Method

The coating can be cast on solid substrate and then lifted off the substrate and placed on electrode or can be directly cast onto electrode.

The coating composition can be applied onto at least one surface of an electrode by means known in the art, such as by brush, roller, ink jet, dip, knife, gravure, wire rod, squeegee, foam applicator, curtain coating, vacuum coating, slot die or spraying. The coating is then dried onto the electrode at room temperature, or at an elevated temperature. The final dry coating thickness is preferably from 1 to 200 microns, preferably from 1 to 100 microns, and more preferably from 2 to 50 microns in thickness.

The coated electrodes can be used to form an electrochemical device, such as a battery, capacitor, electric double layer capacitor, membrane electrode assembly (MEA) or fuel cell, by means known in the art. A non-aqueous-type battery can be formed by placing a negative electrode and positive electrode on either side of the coating. For example if the cathode is coated then an anode can be placed next to the coating, forming an anode-separator coating cathode-assembly.

Aspects of the Invention:

Aspect 1: A reticulated coating or film comprising a) a resin and b) nanoparticles wherein the coating or film has a porous structure wherein the porous structure is from 10% to 80% open pores, wherein the resin has a solution viscosity of from about 100 cp to 10,000 cp, preferably from 100 cp to 5000 cp (at 5 wt % in NMP or at 2% water for water solution polymers, at room temperature) wherein the nanoparticles are lithium based electronically conductive and have a surface area of 1 to 1000 $m^2/g$.

Aspect 2: The reticulated coating or film of aspect 1 wherein the average pore size is less than 500 nm, preferably less than 100 nm, and more preferably less than 50 nm.

Aspect 3: The reticulated coating or film of aspect 1 or aspect 2 wherein the resin is selected from the group consisting of polyvinylidene fluoride (PVDF), PVDF-copolymers, poly ethylene-tetrafluoride ethylene (PETFE), polyvinyl fluoride (PVF), poly acrylates, poly methacrylates, poly styrene, poly vinyl alcohol (PVOH), polyesters, polyamides, poly acrylonitrile, poly acrylamide, carboxymethyl cellulose CMC, polyacrylic acids (PAA), polymethacrylic acids (PMAA), and their copolymers and combinations thereof.

Aspect 4: The reticulated coating or film of any one of aspects 1 to 3 wherein the resin comprises polyvinylidene fluoride homopolymer or copolymer.

Aspect 5: The reticulated coating or film of any one of aspects 1 to 3 wherein the resin comprises poly methacrylates.

Aspect 6: The reticulated coating or film of any one of aspects 1 to 3 wherein the resin comprises carboxymethyl cellulose.

Aspect 7: The reticulated coating or film of any one of aspects 1 to 3 wherein the resin comprises polyacrylic acid and/or polymethacrylic acid.

Aspect 8: The reticulated coating or film of any one of aspects 1 to 7 wherein the nanoparticles is selected from the group consisting of $Li_7La_3Zr_2O_{12}$(LLZO), $Li_3PS_4$ (LSP), $Li_6PS_5X$ (with X=Cl, Br, or I) (Lithium argyrodite), lithium phosphorous oxynitride (Lipon), $Li_{2+2x}Zn_{1-x}GeO_4$ (x=0.55) (LISICON-like), $Li_{0.34}La_{0.51}TiO_3$ (perovskite-like), doped LLZO or mixtures thereof.

Aspect 9: The reticulated coating or film of any one of aspects 1 to 7 wherein the nanoparticles comprise LLZO.

Aspect 10: The reticulated coating or film of any one of aspects 1 to 7 wherein the nanoparticles comprise LSP or LIPON.

Aspect 11: The reticulated coating or film of any one of aspects 1 to 10 wherein the weight percent of polymer to nanoparticles is from 80:20 to 10:90, preferably 70:30 to 20:80.

Aspect 12: The reticulated coating or film of any one of aspects 1 to 11 wherein the nanoparticles have a surface area of from 1 to 700 $m^2/g$, more preferably 1 to 600 m2/g.

Aspect 13: The reticulated coating or film of any one of aspects 1 to 12 wherein the coating has a thickness of from 1 to 300 microns, preferably from 1 to 100 microns, and more preferably from 2 to 50 microns.

Aspect 14: The reticulated coating or film of any one of aspects 1 to 13 wherein the nanoparticle size is less than 500 nm preferably less than 200 nanometers.

Aspect 15: The reticulated coating or film of any one of aspects 1 to 13 wherein the nanoparticle size is less than 100 nm.

Aspect 16: A method of making a reticulated coating or film, the method comprising the steps of a. providing a resin dissolved in a solvent wherein the polymer has molecular weight as measured by solution viscosity of from about 100 cp to 10000 cp, preferably from 100 cp to 5000 cp (at 5 wt % in NMP or at 2 wt % in water for water soluble polymers, at room temperature),
b. providing nanoparticles, wherein the nanoparticles have surface area of 1 to 1000 $m^2/g$,
c. combining the resin solution and the nanoparticles to produce a slurry wherein the weight percent of polymer to the weight percent of nanoparticle is from 80:20 to 5:95,
d. casting the slurry to form a coating or film,
e. drying the formed coating or film wherein the coating or film after drying has a porous structure wherein the porous structure is from 10% to 80% open pores, wherein the slurry exhibits a yield stress of between 50 dyne/cm2 and 5000 dyne/cm2, preferably between 75 to 3000 dyne/cm2, and wherein the solids content of the slurry is from 2 to 30 weight percent solids, preferably between 2 and 20 weight percent solids.

Aspect 17: The method of aspect 16 wherein the average pore size is less than 1000 nanometers Aspect 18: The method of aspect 16 wherein the average pore size is less than 500 nanometers, and more preferably less than 100 nanometers.

Aspect 19: The method of any one of aspects 16 to 18 wherein the resin is selected from the group consisting of polyvinylidene fluoride (PVDF), PVDF-copolymers, poly ethylene-tetrafluoride ethylene (PETFE), polyvinyl fluoride (PVF), poly acrylates, poly methacrylates, poly styrene, poly vinyl alcohol (PVOH), polyesters, polyamides, poly acrylonitrile, poly acrylamide, carboxymethyl cellulose CMC, polyacrylic acids (PAA), polymethacrylic acids (PMAA), and their copolymers and combinations thereof.

Aspect 20: The method of any one of aspects 16 to 18 wherein the resin comprises polyvinylidene fluoride homopolymer or copolymer.

Aspect 21. The method of any one of aspects 16 to 18 wherein the resin comprises poly methacrylates.

Aspect 22. The method of any one of aspects 16 to 18 wherein the resin comprises carboxymethyl cellulose.

Aspect 23. The method of any one of aspects 16 to 18 wherein the resin comprises polyacrylic acid and or polymethacrylic acid.

Aspect 24. The method of any one of aspects 16 to 23 wherein the nanoparticles is selected from the group consisting of $Li_7La_3Zr_2O_{12}$(LLZO), Li3PS4 (LSP), $Li_6PS_5X$ (with X=Cl, Br, or I) (Lithium argyrodite), lithium phosphorous oxynitride (Lipon), $Li_{2+2x}Zn_{1-x}GeO_4$ (x=0.55) (LISICON-like), $Li_{0.34}La_{0.51}TiO_3$ (perovskite-like), doped LLZO or mixtures thereof.

Aspect 25. The method of any one of aspects 16 to 23 wherein the nanoparticles comprise LLZO.

Aspect 26. The method of any one of aspects 16 to 23 wherein the nanoparticles comprises LSP.

Aspect 27. The method of any one of aspects 16 to 26 wherein the solvent is selected from the group consisting of water, N-methyl-2-pyrrolidone (NMP), toluene, tetrahydrofuran (THF), acetone and hydrocarbons.

Aspect 28. The method of any one of aspects 16 to 26 wherein the solvent is selected from the group consisting of NMP, water, acetone and combination thereof, preferably NMP.

Aspect 29. The method of any one of aspects 16 to 26 wherein the solvent comprises water.

Aspect 30. The method of any one of aspects 16 to 26 wherein the solvent comprises NMP.

Aspect 31. The method of any one of aspects 16 to 30 wherein the solids content of the slurry formed containing both the solvent and the nanoparticles is from 2 to 30%, preferably from 2 to 15 weight %.

Aspect 32. The method of any one of aspects 16 to 30 wherein the solids content of the slurry formed containing both the solvent and the nanoparticles is from 2 to 12 weight percent.

Aspect 33. The method of any one of aspects 16 to 32 wherein the weight percent of polymer to the weight percent of nanoparticle is from 80:20 to 5:95, preferably 80:20 to 10:90.

Aspect 34. The method of any one of aspects 16 to 32 wherein the weight percent of polymer to the weight percent of nanoparticle is from 70:30 to 20:80, Aspect 35. The method of any one of aspects 16 to 34 wherein the nanoparticles have a surface area of from 1 to 700 $m^2$/g, more preferably 1 to 600 m2/g.

Aspect 36. The method of any one of aspects 16 to 34 wherein the coating has a thickness of from 1 to 300 microns, preferably from 1 to 100 microns, and more preferably from 2 to 50 microns.

Aspect 37. The method of any one of aspects 16 to 36 wherein the nanoparticle size is less than 500 nm preferably less than 200 nanometers.

Aspect 38. The method of any one of aspects 16 to 36 wherein the nanoparticle size is less than 100 nm.

Aspect 39: The method of any one of aspects 16 to 38 wherein the reticulated film or coating is simultaneously cast directly with the substrate in one step in a wet on wet process.

Aspect 40. The reticulated coating or film made by the method of any one of aspects 16 to 39.

Aspect 41. A battery comprising the coating or film of any one of aspects 1 to 15.

Aspect 41. An article comprising the reticulated coating or film of any one of aspects 1 to 15 wherein the article is selected from the group consisting of an electrochemical device and a particulate filter.

Melt viscosity measured according to ASTM method D-3835 measured at 232° C. and 100 $sec^{-1}$.

Particle size of nano particles can be measured using a Malvern Masturizer 2000 particle size analyzer. The data is reported as weight-average particle size (diameter).

Powder/latex average discrete particle size can be measured using a NICOMP™ 380 submicron particle sizer using laser light scattering. The data is reported as weight-average particle size (diameter).

Density of composite was calculated by dividing the weight of composite over volume of a specific sample. First the composite was cast on an aluminum foil, then a sample having 1.33 cm^2 surface area was made by stamp cutting of the cast composite. The thickness of sample was measured with micrometer having accuracy of 0.1 micron. The weight of composite was measured using an analytical balance and subtracted the weight of the aluminum foil. Density of solid material is based on published literature values: i.e. PVDF polymers=1.78 g/cm3, PMMA=1.13 g/cm3, CMC=1.6 g/cm3.

BET specific surface area, pore volume, and pore size distribution of materials can be determined using a QUANTACHROME NOVA-E gas sorption instrument. Nitrogen adsorption and desorption isotherms are generated at 77K. The multi-point Brunauer—Emmett—Teller (BET) nitrogen adsorption method is used to characterize the specific surface area. A Nonlocal Density Functional Theory (NLDFT, N2, 77 k, slit pore model) is used to characterize the pore volume and pore size distribution.

Solution viscosity: ASTM 2857

Yield stress back calculation: Brookfield Viscometer DV-III Ultra, spindle CP52 calculation based on the Herschel-Bulkley model equation:

$$\tau=\tau^o+kD^n$$

τ=Shear stress (D/cm2) k=Consistency index (cP) n=flow index $\tau^o$=Yield stress (D/cm2) D=Shear rate (1/sec)

τ=Shear stress (D/cm2): force tending to cause deformation of a material by slippage along a plane or planes parallel to the imposed stress.

$\tau^o$=Yield stress (D/cm2): Yield stress is the amount of stress that an object needs to be permanently deformed or start flowing.

k=Consistency index (cP): related to the nature of the fluid. As the fluid becomes more viscous, consistency index increases.

D=Shear rate (1/sec): Shear rate is the rate of change of velocity at which one layer of fluid passes over an adjacent layer.

n=flow index: Flow behavior of complex fluids is traditionally characterized through the distinction between Newtonian and non-Newtonian fluids based on each their viscosity dependences on the rate of deformation and the change of shear rate.

τ is the shear stress, it needs to be divided by the shear rate to get the viscosity. The calculation would be:

$$\frac{\tau^o+\left(\frac{k}{100}\right)D^n}{D}\times 100=\text{Viscosity }(cP)$$

k In the table is expressed in Centipoise so it needs to be divided by 100 to get it in D/cm2 and to add it to $\tau^o$ back calculate $\tau^o$, the equation becomes $$\tau^o=\frac{(\text{Viscosity}\times D)}{100}-\left(\frac{k}{100}\right)D^n$$

EXAMPLES

Example 1: Three different reticulated film composites of PVDF (Kynar) and LLZO using NMP as solvent and at about 8% solid content. Ratio of PVDF to LLZO is 50:50, 30:70 and 70:30. Porosity is determined by comparing the measured density to the solid density. The difference in density due to porosity. [1−(measured density/solid density)] *100=% porosity.

Reticulated films will form. Porosity that can be obtained using the method of the invention. Adjusting the weight ratio of resin to nano particle can be used to change the porosity.

Example 2: Reticulated film composites made of LLZO with PVDF (Kynar HSV-900) and PMMA with RV=1.1. and LLZO using NMP as solvent and at about 8% solid content and at 15%. Ratio of PVDF to LLZO is 50:50, 30:70 and 70:30 and ratio of PMMA to LLZO is 50:50, 30:70 and 70:30. Porosity is determined by comparing the measured density to the solid density. The difference in density due to porosity. [1−(measured density/solid density)]*100=% porosity.

Reticulated films will form using different polymers. This shows the porosity that can be obtained using the method of the invention. Adjusting the weight ratio of resin to nano particle can be used to change the porosity.

The invention claimed is:

1. A solid electrolyte separator comprising a reticulated coating or film comprising a) a resin and b) nanoparticles wherein the coating or film has an open porous structure, wherein the porous structure is from 10 vol. % to 80 vol % open pores, wherein the resin has a solution viscosity of from about 100 cp to 10,000 cp (at 5 wt % in NMP or at 2% water for water soluble polymers, at room temperature), wherein the nanoparticles are lithium based, electronically conductive and have a surface area of 1 to 1000 $m^2/g$ and wherein the average pore size is less than 500 nm.

2. The solid electrolyte separator of claim 1, wherein the average pore size is less than 100 nm.

3. The solid electrolyte separator of claim 1, wherein the resin is selected from the group consisting of homopolymers and copolymers of: polyvinylidene fluoride (PVDF), poly ethylene-tetrafluoride ethylene (PETFE), polyvinyl fluoride (PVF), poly (alkyl) acrylates, poly (alkyl) methacrylates, poly styrene, poly vinyl alcohol (PVOH), polyesters, polyamides, poly acrylonitrile, poly acrylamide, carboxymethyl cellulose CMC, polyacrylic acids (PAA), polymethacrylic acids (PMAA); and combinations thereof.

4. The solid electrolyte separator of claim 1, wherein the resin comprises polyvinylidene fluoride homopolymer or copolymer.

5. The solid electrolyte separator of claim 1, wherein the resin comprises at least one of poly methacrylates or carboxymethyl cellulose.

6. The solid electrolyte separator of claim 1, wherein the resin comprises polyacrylic acid.

7. The solid electrolyte separator of claim 1, wherein the nanoparticles is selected from the group consisting of Li7La3Zr2O12 (LLZO), Li3PS4 (LSP), Li6PS5X (with X=Cl, Br, or I) (Lithium argyrodite), lithium phosphorous oxynitride (Lipon), Li2+2xZn1-xGeO4 (x=0.55) (LISICON-like), Li0.34La0.51TiO3 (perovskite-like), doped LLZO or mixtures thereof.

8. The solid electrolyte separator of claim 1, wherein the nanoparticles comprise LLZO.

9. The solid electrolyte separator of claim 1, wherein the nanoparticles comprise LSP or LIPON.

10. The solid electrolyte separator of claim 1, wherein the weight percent of polymer to nanoparticles is from 80:20 to 10:90.

11. The solid electrolyte separator of claim 10, wherein the nanoparticles have a surface area of from 1 to 700 $m^2/g$.

12. The solid electrolyte separator of claim 1, wherein the coating has a thickness of from 1 to 300 microns.

13. A method of making a solid electrolyte separator, the method comprising the steps of a) providing a resin dissolved in a solvent, wherein the polymer has molecular weight as measured by solution viscosity of from about 100 cp to 10000 cp (at 5 wt % in NMP or at 2 wt % in water for water soluble polymers, at room temperature), b) providing nanoparticles, wherein the nanoparticles have surface area of 1 to 1000 $m^2/g$, c) combining the resin dissolved in a solvent and the nanoparticles to produce a slurry, wherein the weight percent of polymer to the weight percent of nanoparticle is from 80:20 to 5:95, d) casting the slurry to form a coating or film, e) drying the formed coating or film, wherein the coating or film after drying has a porous structure, wherein the porous structure is from 10 vol % to 80 vol % open pores, and the average pore size is less than 500 nm, wherein the slurry exhibits a yield stress of between 50 dyne/cm2 and 5000 dyne/cm2, and wherein the solids content of the slurry is from 2 to 30 weight percent solids.

14. The method of claim 13, wherein the resin is selected from the group consisting of homopolymers and copolymers of: polyvinylidene fluoride (PVDF), poly ethylene-tetrafluoride ethylene (PETFE), polyvinyl fluoride (PVF), poly (alkyl) acrylates, poly (alkyl) methacrylates, poly styrene, poly vinyl alcohol (PVOH), polyesters, polyamides, poly acrylonitrile, poly acrylamide, carboxymethyl cellulose CMC, polyacrylic acids (PAA), polymethacrylic acids (PMAA); and combinations thereof.

15. The method of claim 13, wherein the resin comprises polyvinylidene fluoride homopolymer or copolymer.

16. The method of claim 13, wherein the nanoparticles is selected from the group consisting of Li7La3Zr2O12 (LLZO), Li3PS4 (LSP), Li6PS5X (with X=Cl, Br, or I) (Lithium argyrodite), lithium phosphorous oxynitride (Lipon), Li2+2xZn1-xGeO4 (x=0.55) (LISICON-like), Li0.34La0.51TiO3 (perovskite-like), doped LLZO or mixtures thereof.

17. The method of claim 13, wherein the solids content of the slurry formed containing both the solvent and the nanoparticles is 2 to 15 weight %.

18. The method of claim 13, wherein the solid electrolyte separator is simultaneously cast directly with the substrate in one step in a wet on wet process.

19. A battery comprising the solid electrolyte separator of claim 1.

20. An article comprising the solid electrolyte separator of claim 1, wherein the article is an electrochemical device.

* * * * *